United States Patent [19]

Olczak

[11] Patent Number: 5,321,683
[45] Date of Patent: Jun. 14, 1994

[54] DIGITAL OPTICAL TAPE READ SYSTEM

[75] Inventor: Eugene G. Olczak, Rochester, N.Y.

[73] Assignee: Eastman Kodak Company, Rochester, N.Y.

[21] Appl. No.: 998,087

[22] Filed: Dec. 28, 1992

[51] Int. Cl.$^5$ .................. G11B 7/14; G11B 7/125; G11B 7/00

[52] U.S. Cl. .................. 369/112; 369/44.23; 369/59; 369/95; 369/122

[58] Field of Search .............. 369/44.23, 59, 95, 110, 369/112, 122

[56] References Cited

U.S. PATENT DOCUMENTS

| | | | |
|---|---|---|---|
| 4,519,054 | 5/1985 | Jewer | 369/30 |
| 4,567,585 | 1/1986 | Gelbart | 369/97 |
| 4,633,455 | 12/1986 | Hudson | 369/45 |
| 4,661,941 | 4/1987 | Bell et al. | 369/111 |
| 4,807,213 | 2/1989 | Chung et al. | 369/46 |
| 4,870,633 | 9/1989 | Matsushita et al. | 369/47 |
| 4,939,715 | 7/1990 | Vogelgesang et al. | 360/93 |
| 5,081,617 | 1/1992 | Gelbart | 369/112 |
| 5,097,457 | 3/1992 | Keens et al. | 369/44.17 |
| 5,120,136 | 6/1992 | Oakley | 369/97 |

FOREIGN PATENT DOCUMENTS

| | | | |
|---|---|---|---|
| 0029154 | 2/1983 | Japan | G11B 14 |
| 0096746 | 4/1988 | Japan | G11B 14 |

OTHER PUBLICATIONS

A. B. Marchant, "Optical Recording-A Technical Overview", Addison-Wesley Publishing Co., 1990, Chapter 6, pp. 60-62.

J. W. Goodman, "Introduction of Fourier Optics", McGraw-Hill, 1968, pp. 120-131.

*Primary Examiner*—Paul M. Dzierzynski
*Assistant Examiner*—David V. Bruce
*Attorney, Agent, or Firm*—William W. Holloway

[57] ABSTRACT

Method and apparatus for reading digital data stored on an optical tape are achieved with a digital optical tape read system including an optical tape and an illumination arrangement. The optical tape has bit cells which are stored along a plurality of tracks of bit cells. Each track includes a line of bit cells, and each bit cell has either a first spot power reflectance representative of a first binary value, or a second spot power reflectance representative of a second binary value. The illumination arrangement functions to illuminate a predetermined area of the optical tape covering a plurality of bit cells with incident light that provides substantially a 180° phase difference between adjacent bit cell locations on the optical tape to be concurrently read. The method of illuminating and reading data stored on an optical tape comprises a first step of generating a collimated coherent light beam which is directed at the optical tape, and a second step of imaging the coherent light beam into a predetermined area of the optical tape covering a plurality of bit cells with light that provides substantially a 180° phase difference between adjacent bit cell locations on the optical tape to be concurrently read.

16 Claims, 6 Drawing Sheets

FIG. 6

DIGITAL OPTICAL TAPE READ SYSTEM

FIELD OF THE INVENTION

The present invention relates to digital optical tape read systems, and, more particularly, to digital optical tape read systems that illuminate a surface of the optical tape at an area to be read with a line of light.

BACKGROUND OF THE INVENTION

Various prior art systems are available using magnetic tape, a magnetic or optical disk, and an optical tape for the storage and retrieval of information. Each of these systems have certain objectives. For example, magnetic tape or magnetic disk is typically used for the storage and retrieval of information on computers and the like. However, an increasing number of users of stored information are facing requirements of expanded storage capacity, faster and better retrieval, and lower cost than found in for example, the prior art magnetic tape or magnetic disk data storage systems. Therefore, there has been a move to denser and denser magnetic disks and tapes, and, more recently, to optical disks and optical tapes.

U.S. Pat. No. 4,661,941 (A. Bell et al.), issued on Apr. 28, 1987, and U.S. Pat. No. 4,669,070 (A. Bell), issued on May 26, 1987, disclose an optical tape record and playback system. More particularly, in a recording process, a laser has its coherent light beam modulated by data to be recorded. The laser transmits this coherent non-circular light beam into a collecting objective lens which images the beam onto a beam expander that changes the non-circular light beam into a circular light beam. The circular light beam is then transmitted through a polarizing beam splitter and quarter-wave plate and onto a switching mirror which switches back and forth. The beam reflected by the switching mirror is reflected by a series of mirrors and onto the optical tape. In a playback mode the laser is biased to emit a linearly polarized continuous light beam with a predetermined intensity that does not disturb the absorptive layer of the optical tape. The light beam takes the same path to the optical tape used to record information thereon, but the polarization is changed by the quarter-wave plate. The light reflected from the optical tape returns over the same path to the quarter-wave plate where the polarization is again changed in order that the light beam is reflected by the polarization beam splitter onto a photodetector. The light pattern of the reflected light beam is converted into representative electrical signals by the photodetector for use by a data using device.

U.S. Pat. No. 5,081,617 (D. Gelbart), issued on Jan. 14, 1992, discloses an optical system for reading and tracking multiple tracks of optically recorded data. For reading optically stored data, polarized light from a laser diode is collected by a collecting lens and is then shaped by a shaping lens into a narrow line of light. The light in the line of light is polarized parallel to the length of the line and is reflected by a polarizing beam splitter through a quarter-wave plate where the polarization in the line of light is changed to a circular polarization. The line of light impinges across a plurality of recorded tracks on the optical tape. The reflected light beam is transmitted back through the quarter-wave plate where the polarization is changed to a linear polarization normal to the original laser light beam. Such polarized light beam is directed straight through the polarizing beam splitter and imaged onto a light detector array via and imaging lens.

It is desirable to provide a simple and inexpensive digital optical tape read system which provides improved resolution of an image of a recorded data pattern stored on an optical tape at a detector array from resolutions obtained in prior art optical tape system of similar, or even greater complexity.

SUMMARY OF THE INVENTION

The present invention is directed to a digital optical tape read system and a method of illuminating and reading data stored on an optical tape which provides improved resolution of an image of a recorded data pattern stored on an optical tape at a detector array. The digital optical tape read system comprises an optical tape, and illumination means. The optical tape has bit cells which are stored along a plurality of tracks of bit cells. Each track comprises a line of bit cells, and each bit cell is representative of a bit of data from one of a group consisting of a first spot power reflectance representative of a first binary value and a second spot power reflectance representative of a second binary value. The illumination means is used to illuminate a predetermined area of the optical tape with light that provides a 180° phase difference between bit cell locations on the optical tape to be concurrently read.

The method of illuminating and reading data stored on an optical tape comprises a first step of generating a collimated coherent light beam which is directed at the optical tape, and a second step of imaging the coherent light beam onto a predetermined area of the optical tape with light that provides a 180° phase difference between bit cell locations on the optical tape to be concurrently read.

The invention will be better understood from the following more detailed description taken with the accompanying drawings and claims.

The drawings are not necessarily to scale.

DETAILED DESCRIPTION

Figure 1:
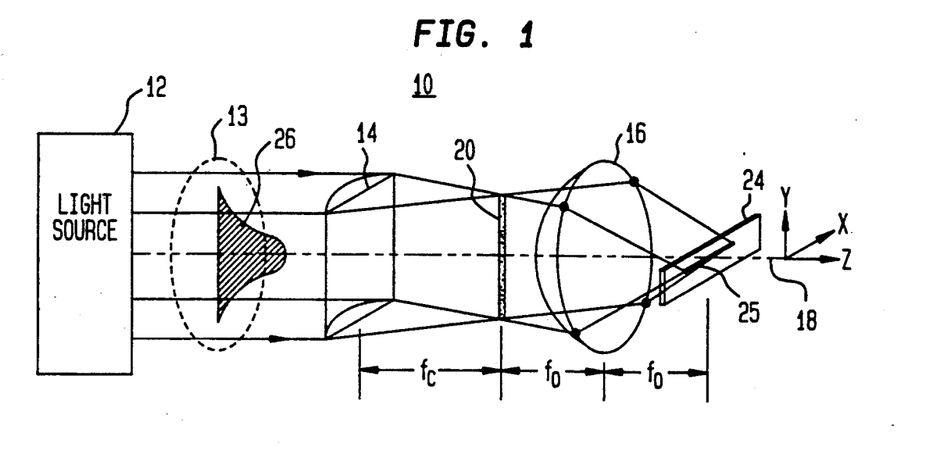
FIG. 1 shows a view in perspective of an optical tape illumination arrangement with confocal and axially aligned lenses for use in an digital optical tape read system.

Referring now to FIG. 1, there is shown a view in perspective of an optical tape illumination arrangement 10 for use in a digital optical tape read system (not shown). The optical tape illumination arrangement 10 comprises a light source 12 for providing a coherent collimated beam of light 13 (shown within a dashed-line circle), a cylindrical lens 14, and an objective lens 16 which are aligned along a longitudinal axis 18. More particularly, the light source 12 comprises, for example, a laser (not shown) providing the coherent beam of light 13, and a collimating lens (not shown) which collimates the beam of light from the laser before the light beam passes through the cylindrical lens 14. The cylindrical lens 14 functions to converge the light beam 13 in a "x" direction (shown by the "x" arrow) but not in a "y" direction (shown by the "y" arrow) to form a linear beam of light 20 at a focal plane (not shown) at a distance "fc" from the cylindrical lens 14. The light beam 13 again diverges in the "x" direction from the focal plane at "fc" and is intercepted by the objective lens 16. The objective lens 16 and the cylindrical lens 14 are arranged confocally (the focal plane at a distance "fc" from the cylindrical lens 14, corresponds with a front focal plane at a distance "fo" from the objective lens) along the longitudinal axes 18 of the lenses 14 and 16.

In passing through the objective lens 16, the linear beam of light 20 is imaged to a line foci (line of light) 25 disposed normal to the line of light 20 at a back focal plane a distance "fo" from the objective lens 16. The line of light 25 is positioned on a surface of an optical tape 24 in an area where stored data on the optical tape 24 is to be read.

For purposes of description, it is assumed that the collimated coherent light beam 13 from the light source 12 is a circularly symmetric Gaussian beam 13 (as shown by the hatched bell-shaped cross-sectional Gaussian profile 26) with a 1/e amplitude radius "b1". With such circularly symmetric Gaussian beam 13, the amplitude at the line foci 25 is separable and Gaussian in the "x" and "y" directions. If the light beam 13 is far from being in focus in the "x" direction (along the length of the line of light 25) and the radius b1 is large, then geometric optics (ray tracings) are sufficient to describe the amplitude. In such case, the 1/e length of the line, referred to hereinafter as "bx", of line foci 25 is given by the equation:

$$bx = (b1)(fo/fc), \quad (1)$$

where "fo" was defined hereinbefore as the effective focal length of the objective lens 16, and "fc" was defined hereinbefore as the effective focal length of the cylindrical lens 14. The width of the line foci of light 25 in the "y" direction, referred to hereinafter as "by", is diffraction limited and given by the equation:

$$by = [(\alpha)(fo)/[(\pi)(b1)]] \quad (2)$$

where $\alpha$ is the wavelength of the coherent light beam 13. The confocal arrangement of the cylindrical lens 14 and the objective lens 16 provides a linear phase front along the line of light 25. In other words the phase of the illumination along the length of the line of light 25 is linear.

The desired illumination profile of the line of light 25 at the surface of the optical tape 24 has a width in the y-direction that is no greater than a width of a track of stored data, and a length in the x-direction that is sufficient to provide some degree of uniformity over a specified number of parallel tracks. A track of stored data is defined as a line of a predetermined number of bits (marks) of digital data stored on the optical tape along a swath having a width equal to the specified number of parallel tracks, as will be discussed hereinafter relative to FIG. 4. The width of the desired illumination profile can be met if the track width is greater than or equal to a diffraction limited spot size produced by the lens at the surface of the optical tape 24. Mark size is defined as the diameter of a mark on the optical tape 24 representing a bit of information. The length of the desired illumination profile is determined by detector electronics (not shown) which is used to read the stored data represented in a light beam reflected from the illumination profile (line of light) impinging the optical tape 24.

Figure 2:
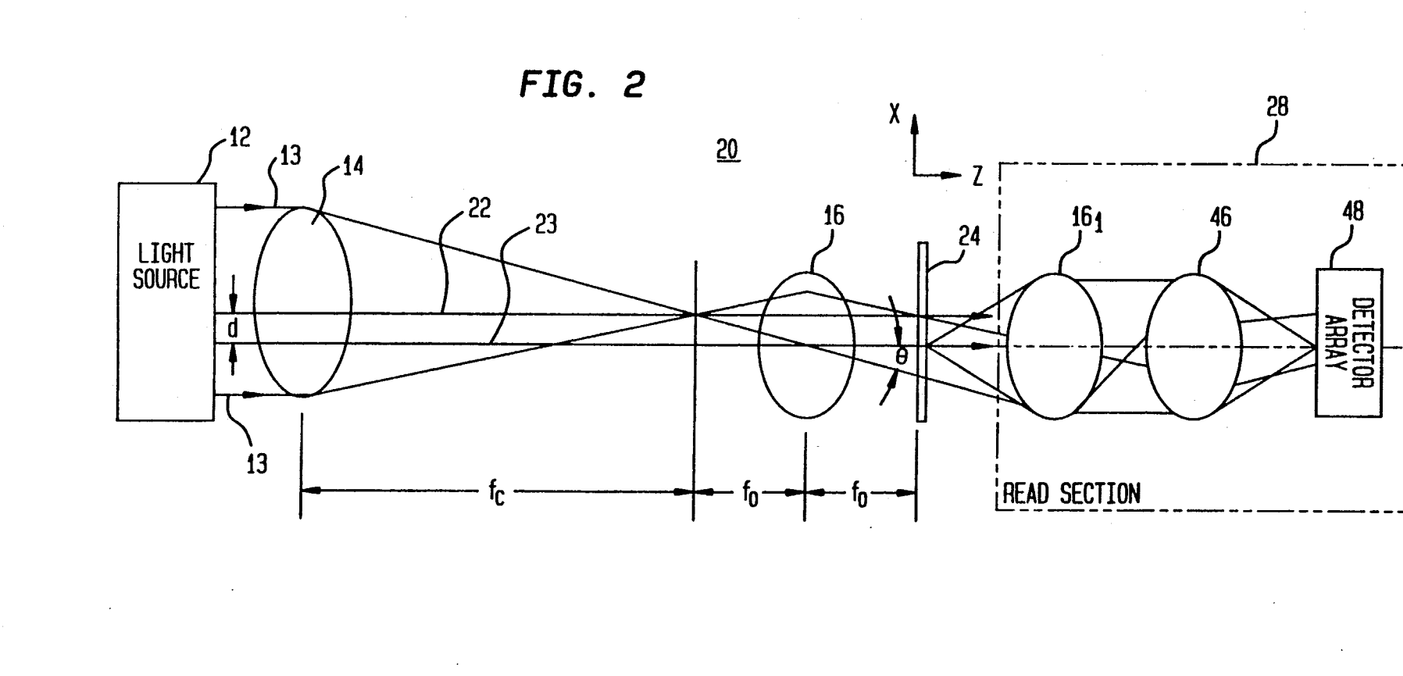
FIG. 2 shows a diagram of the optical tape illumination arrangement of an digital optical tape read system, which is similar to the arrangement of FIG. 1, having a cylindrical lens which is decentered from an axis of an objective lens in accordance with the present invention.

Referring now to FIG. 2, there is shown an optical tape illumination arrangement 20 in accordance with the present invention which is similar to the digital optical tape read arrangement 10 of FIG. 1. It is to be understood hereinafter that corresponding elements having the same function in the various figures are given the same designation number. The optical tape illumination arrangement 20 comprises a light source 12 for providing a coherent beam of light 13, a cylindrical lens 14 having a longitudinal axis 22, and an objective lens 16 having a longitudinal axis 23. In illumination arrangement 20, the longitudinal axis 22 of the cylindrical lens 14 is decentered in the x-direction by a predetermined distance "d" from the longitudinal axis 23 of the objective lens 16.

When considering the illumination profile discussed hereinbefore, it is also necessary to consider phase as well as amplitude because of the coherent nature of the illumination produced by the light source 12. As stated hereinbefore, if the cylindrical lens 14 is located along the longitudinal axis 23 of the objective lens 16 such that it is confocal with the objective lens 16, as is shown in FIG. 1, then the change in phase along the length of the line of light 25 in the x-direction is zero. However, if the cylindrical lens 14 is decentered by the distance "d" as shown in FIG. 2, the difference in phase between adjacent bit cells or spots is adjustable by changing the distance "d" to enhance the resolution at bit cell spacings "s" in accordance with the present invention. Resolution is hereinafter defined as the ability to better determine a binary value of data stored at each bit cell or spot.

More particularly, two mutually coherent point sources (e.g., light reflected from two bit cells or spots) separated by a Rayleigh distance $\delta = 1.22\alpha(f/\#)$ are best resolved when there is a 180° phase difference between the point sources, where f/# is the focal number of a lens, and $\alpha$ is the wavelength of the coherent light beam. For a general discussion on resolution versus phase differences see, for example, the book by J. W. Goodman entitled "Introduction to Fourier Optics", McGraw-Hill, 1968, at pages 129–131. However, related to the optical tape illumination arrangement 20, the bit spacing "s" is comparable to the wavelength $\alpha$ of the coherent light beam 13, and the resolution is greatly improved when there is a 180° phase difference between bit cell centers. Given a predetermined decentering distance "d", the normalized field along a line is given by:

$$u(x, 0) = [e^{-(x/bx)^2}][e^{-i(2\pi x/\alpha)\cos\theta}], \quad (3)$$

where $$\theta = \tan^{-1}[d/fo] = \sim \sin^{-1}\left[\frac{\frac{1}{2}\alpha}{s}\right] \quad (4)$$

for a 180° phase difference between bit cells. The angle $\theta$ is shown in FIG. 2 as representing an acute angle between the longitudinal axis 23 of the objective lens 16 and a light ray of the light beam 13 diffracted therefrom by the objective lens 16 due to the offset cylindrical lens 14.

This technique essentially shifts the spectrum of an optical signal so that there is asymmetry in low-pass filtering effects of the optics. The objective lens 16 is the limiting aperture (entrance pupil). Still further, it is the focal number "f/#", or the numerical aperture (N.A.) thereof that determines a frequency cut-off of arrangement 20. It is to be understood that the spatial frequency spectrum of the stored data information on the optical tape 24 is typically Hermitian (because the data is real). In other words, the data stored on the optical tape 24 is encoded as a difference in amplitude between the reflectance of a stored bit and the reflectance of an unexposed optical tape area between stored bits. With the stored information being merely differences in the amplitude of the reflectance with no phase content, the result is a real optical signal rather than a complex optical signal received, for example, from a hologram. Thus, comparable resolving power along a line of light (not shown) produced on the optical tape 24 in FIG. 2 is achieved for an objective lens 16 with approximately one-half of the nominal aperture than is normally required in a confocal arrangement. However, the enhancement of resolution does not apply to imaging across a line of light 25 when the effect of 180° phase differences is not achieved across the line of light 25 at the optical tape 24.

An exemplary optical tape illumination arrangement 20 is assumed to have the parameters of $\alpha=0.780$ μm, $s=1.50$ μm, $fc=80$ mm, $fo=5.13$ mm, a focal number $f/\#=1.14$ of the objective lens 16, and a duty cycle of $\frac{2}{3}$ so that a diameter cell (dot) on the optical tape 24 is 1 μm. For sake of simplicity, it is further assumed that a radius "r" of the objective lens 16 is approximately equal to 2.25 mm, and that the 1/e amplitude radius $b1=r/2$ and any truncation effects (clipping) of the light beam 13 are ignored. This is reasonable since a key feature of this approach is not the amplitude profile of the line of light 25 but rather the phase differences. Still further, it is to be understood that the results obtained above are similar for an arbitrarily shaped light beam 13. From the given parameters and using Equation (4), the decenter distance $d=1.33$ mm, and the angle $\theta=14.6°$ for the exemplary optical tape illumination arrangement 20. Thus the width of the line "by" is equal to 1.13 μm, and the length "bx" of the line of light 25 is equal to 144 μm.

The optical tape illumination arrangement 20 is extendable to read information stored on the optical tape 24 using a read section 28 (shown within a dashed-line rectangle) comprising a second objective lens $16_1$, an imaging lens 46, and a detector array 48. In operation, light passing through the illuminated portion of the optical tape 24 enters the read section 28 and propagates through a second objective lens $16_1$. At the second objective lens $16_1$, for example, a diverging light beam emanating from the optical tape 24 on the longudinal axis 23 is collimated and continues to the imaging lens 46 (e.g. a spherical lens). The imaging lens 46 causes the light passing through the optical tape 24 to be imaged onto the detector array 48. The detector array 48 is responsive to the imaged light to produce electrical output signals representative of the data stored on the optical tape 24 for use by an output device (not shown) such as a computer.

Figure 3:
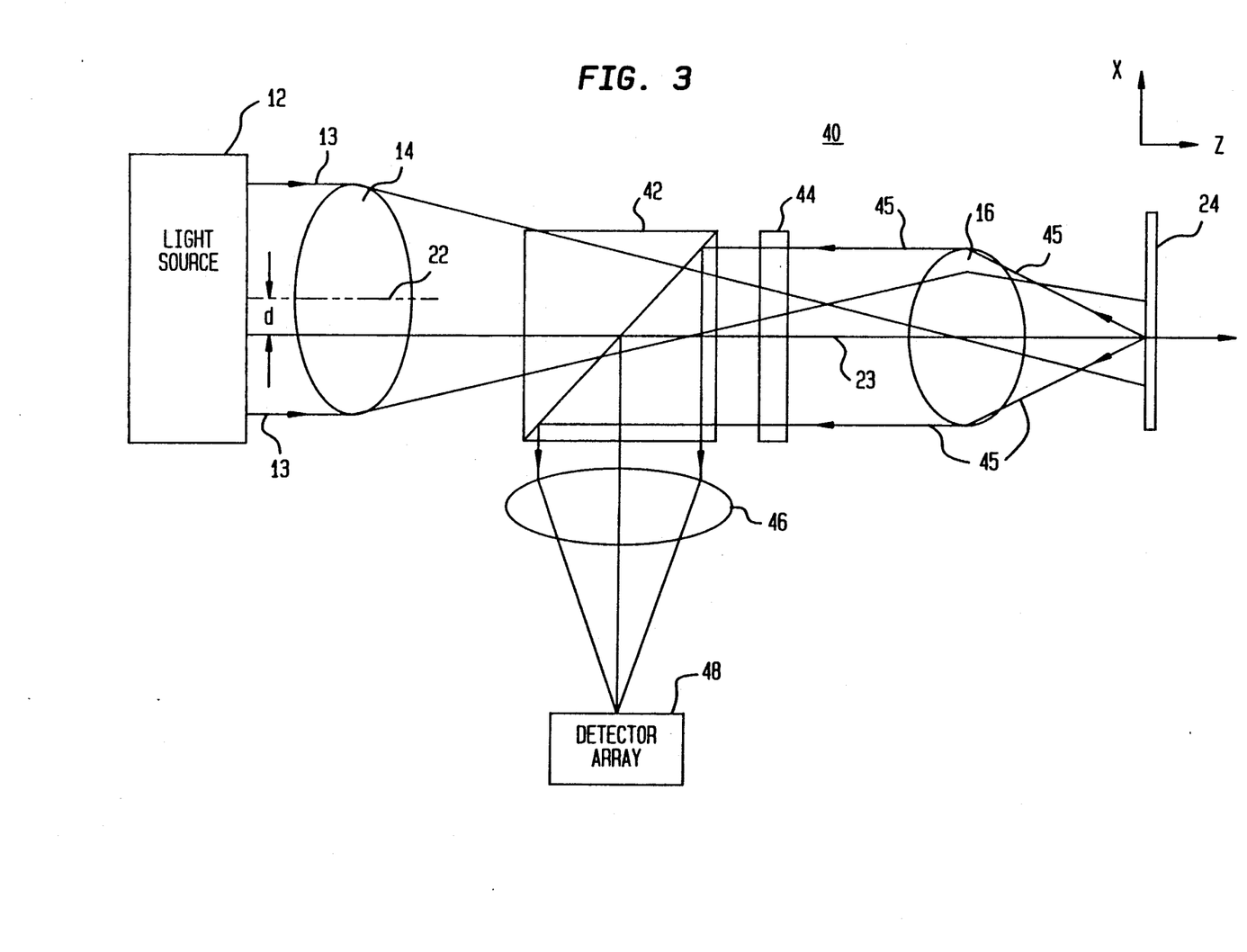
FIG. 3 shows a block diagram of a digital optical tape read system using the optical tape illumination arrangement of FIG. 2 in accordance with the present invention.

Referring now to FIG. 3, there is shown a digital optical tape read system 40 in accordance with the present invention using the optical tape illumination arrangement 20 of FIG. 2. The digital optical tape read system 40 comprises a light source 12 for generating a collimated coherent beam of light 13 of a predetermined polarization, a cylindrical lens 14 having a longitudinal axis 22, an objective lens 16 having a longitudinal axis 23, an optical tape 24, a polarizing beam splitter (PBS) cube 42, a quarter-wave plate 44, an imaging lens 46, and a detector array 48. The light source 12, the cylindrical lens 14, the polarizing beam splitter cube 41, the quarter-wave plate 44, the objective lens 16, and the optical tape 24 are disposed in series. Still further, the longitudinal axis 22 of the cylindrical lens 14 is decentered from the longitudinal axis 23 of the objective lens 16 by a predetermined distance "d" in an x-direction shown by the arrow "x".

In operation, the light source 12 generates the collimated coherent beam of light 13 with, for example, a predetermined first linear polarization which is directed at the cylindrical lens 14. The cylindrical lens 14 functions to converge the light beam 13 in the "x" direction but not in the "y" direction as described hereinbefore in the description of FIGS. 1 and 2. The PBS cube 42 is positioned to receive the converging beam of light 13 with the first linear polarization from the cylindrical lens 14, and to pass the light beam 13 directly therethrough to the quarter-wave plate 44. The quarter-wave plate 44 causes the first linear polarization of the light beam 13 to be converted to a circular polarization. The circularly polarized light beam 13 is imaged on the optical tape 24 by the objective lens 16 so that a difference in phase between adjacent bit cells is adjusted to enhance the resolution at the bit spacings "s" (not shown) on the optical tape 24 along a line of light (not shown) as described hereinbefore for illumination arrangement 20 of FIG. 2.

A reflected light beam 45 from the illuminated optical tape 24 propagates through the objective lens 16 where the circularly-polarized light beam is collimated and continues to the quarter-wave plate 44. In passing through the quarter-wave plate 44, the reflected light beam 45 is converted from the circular polarization to a second linear polarization which is orthogonal to the first linear polarization. This reflected light beam 45 with the second linear polarization enters the PBS 42 and is reflected towards the imaging lens 46. The imaging lens 46 causes the reflected light beam 45 to be imaged onto the detector array 48. The only restriction on the imaging lens 46 is that it be diffraction-limited with an aperture large enough so that aperture stop of the system is at the objective lens 16.

Figure 4:
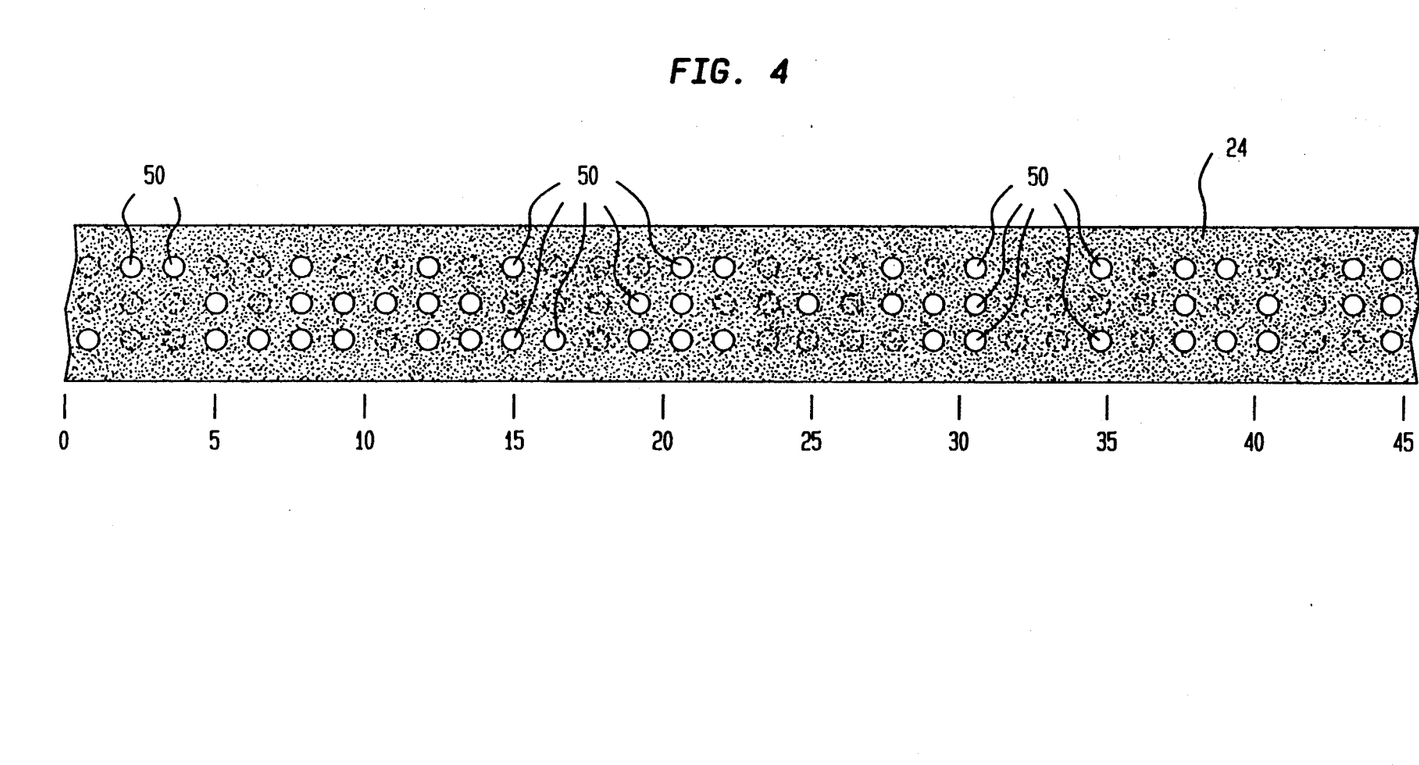
FIG. 4 shows an optical tape with an exemplary random data pattern on a track thereon for use with the digital optical tape read system of FIG. 3.

Referring now to FIG. 4, there is shown a portion of an optical tape 24 having an exemplary random bit data pattern thereon with a bit cell or spot power reflectance of, for example, 1.0 and a background power reflectance of, for example, 0.5 for use with the digital optical tape read system 40 of FIG. 3. More particularly, the random bit data pattern shown includes three rows and 32 columns of bit cells 50 along 0–45 positions on the optical tape 24, where each position is separated by an exemplary distance of 1.5 μm along the optical tape 24. A bit cell provides a representation of a first digital value with a spot power reflectance of the exemplary 1.0 or a second digital value with a spot power reflectance of the exemplary 0.5. Therefore, although only certain bit cells (not shown as stippled) with the power reflectance of the exemplary 1.0 are indicated with the designation number 50, it is to be understood that there exist bit cells 50 (which are shown with stippling) with the spot power reflectance of the exemplary 0.5 which form part of the background. For example, in the first column on the left-hand side near position 0, the bit cells 50 (not provided with a designation number and shown with stippling) in the first and second rows are stored with the spot power reflectance of the exemplary 0.5 while the bit cell 50 (shown without stippling) in the third row is stored with a spot power reflectance of the exemplary 1.0. Still further, it is assumed hereinafter that a track is defined as a column of bit cells 50, where each track on the optical tape 24 includes a predetermined number of bits cells 50 (only three are shown per track) along a length of a swath, and each swath on the optical tape 24 has a width that includes a predetermined number of tracks (only 32 tracks are shown).

As was stated hereinbefore in the description of FIG. 1, the desired illumination profile of the line of light 25 at the surface of the optical tape 24 has a width in the y-direction (along a column) that is no greater than a width of a track of stored data, and a length in the x-direction the spacing between written marks of (along a row) that is sufficient to provide some degree of uniformity over a specified number of parallel tracks. Therefore, when the optical tape 24 of FIG. 4 is being scanned by the optical tape illumination arrangement 10 or 20 of FIGS. 1 and 2, respectively, it is assumed hereinafter that at least a portion of the line of light 25 (only shown in FIG. 1) covers one row (the 32 columns or tracks) of the data pattern of FIG. 4. The line of light 25 covering one row of the swath is two-dimensional Gaussian with a Gaussian bell-shaped amplitude profile in each of the x and y directions that is sufficiently wide along a row so that there is little fall off between positions 0–45 and is centered at position 22.5. The line of light 25 is then scanned in time down the sequential rows of the data pattern of FIG. 4.

Figure 5:
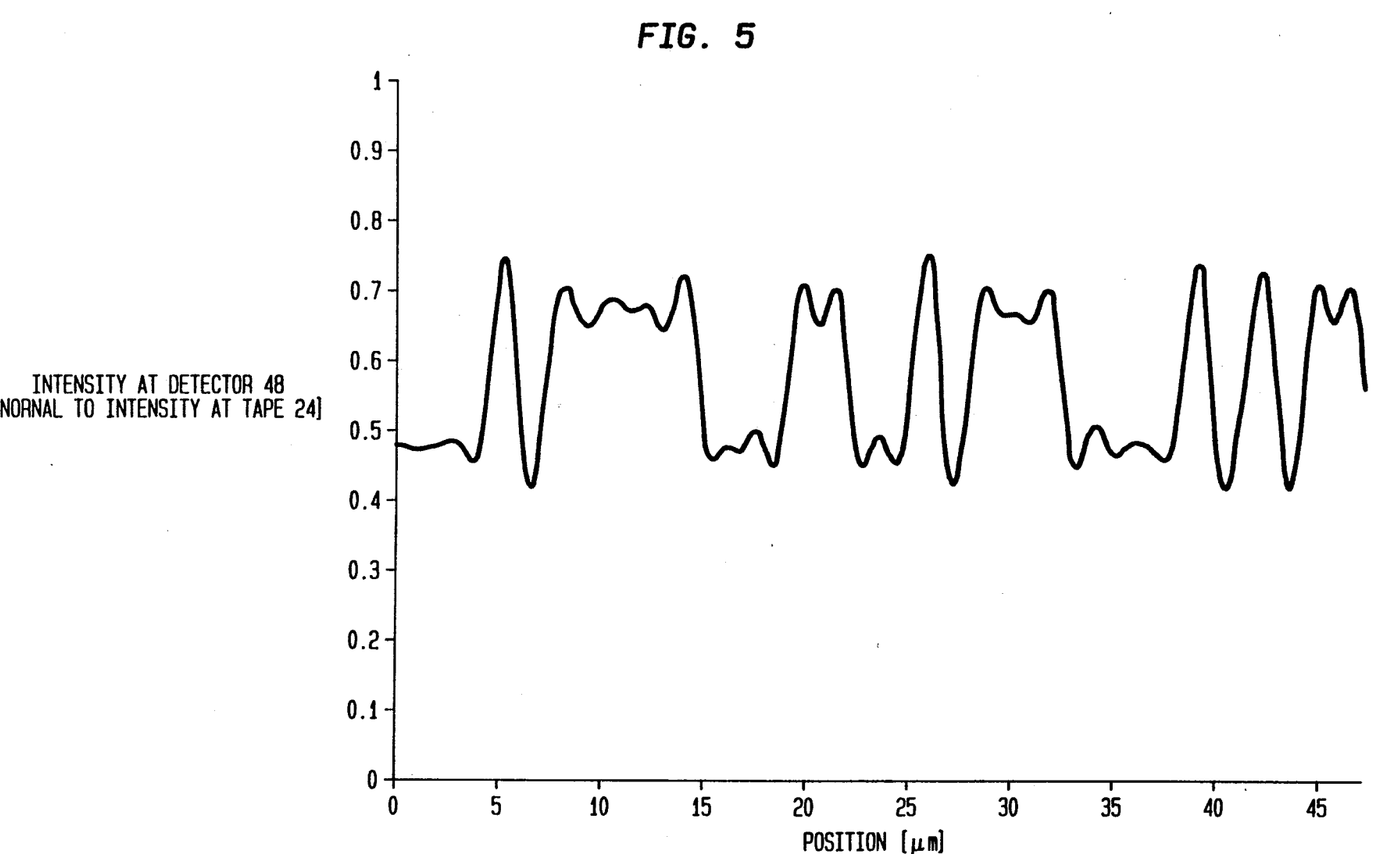
FIG. 5 shows a graph of an image formed at a detector array along a central row of the random data pattern of FIG. 4 when a cylindrical lens is not decentered from an objective lens in the illumination arrangement of FIG. 1.
Figure 6:
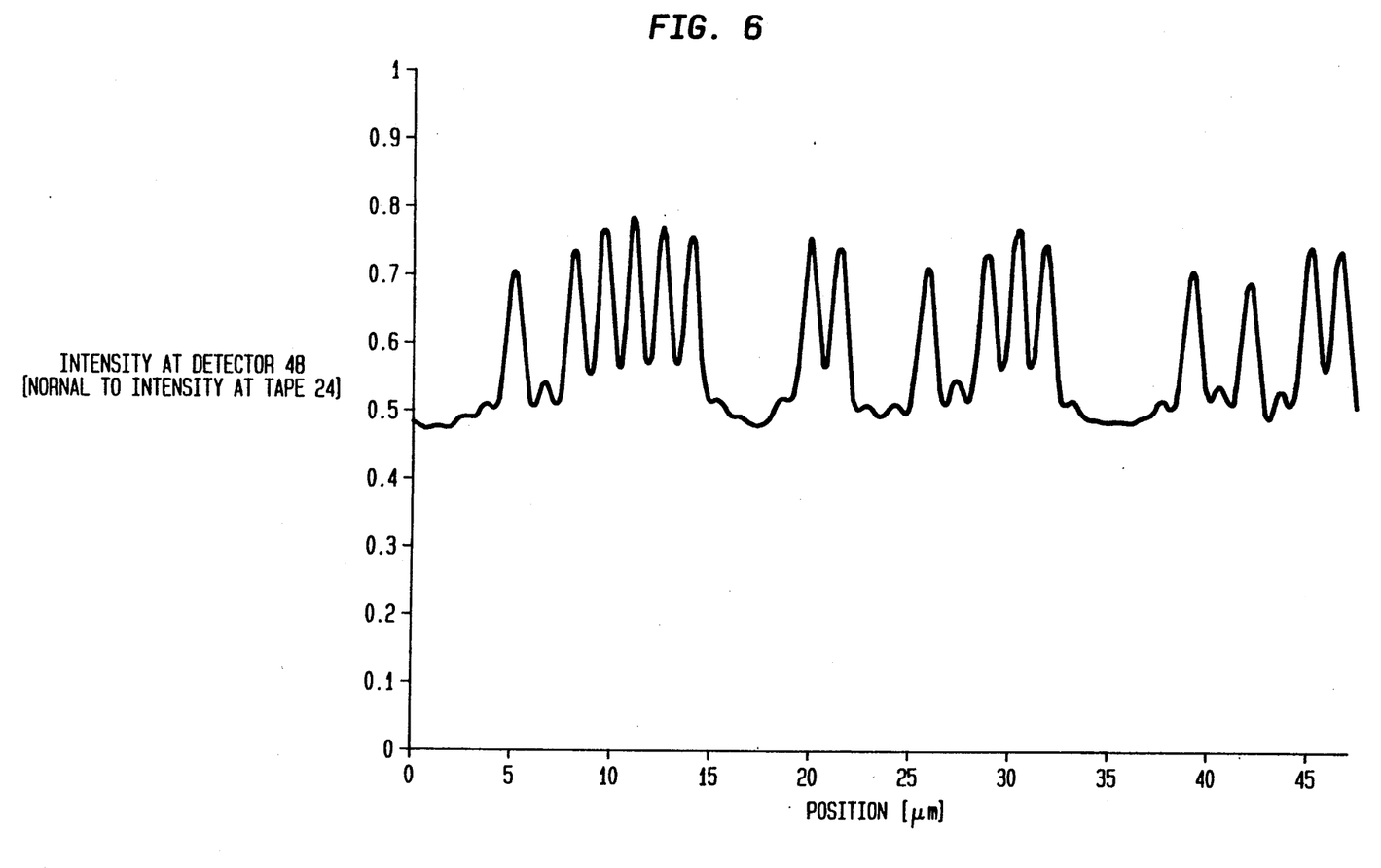
FIG. 6 shows a graph of an image formed at a detector array along the center line of the random data pattern of FIG. 4 when a cylindrical lens is decentered from an objective lens the illumination arrangement of FIG. 2 in accordance with the present invention.

Referring now to FIGS. 5 and 6, FIG. 5 shows a graph of intensity versus position of an image formed at a detector array (not shown) along the center of the central line (row) of the random data pattern of FIG. 4 when a cylindrical lens is not decentered from an objective lens (d=0) in the illumination arrangement 10 of FIG. 1, and FIG. 6 shows a graph of intensity versus position of an image formed at a detector array 48 (shown only in FIG. 3) along the center of the central line of the random data pattern of FIG. 4 when a cylindrical lens is decentered from an objective lens (d=1.33 mm) in the illumination arrangement 20 of FIG. 2. In the graph of FIG. 5, although there are areas of higher intensity at spot locations having a spot power reflectance of the exemplary 1.0, the location of individual spots in a cluster of spots having a spot power reflectance of the exemplary 1.0 does not always match the location of the intensity peaks found in the image at the detector array.

More particularly, the sequence of five spots located at columns 6–10 (approximate positions 8–14) of the random pattern of FIG. 4, are not detected as five separate peaks or sub-peaks of the intensity profile in FIG. 5 at their individual positions along a row of data. However, when the cylindrical lens 14 is decentered (d=1.33 mm) from the objective lens 16 in optical tape illumination arrangement 20 having the exemplary parameters indicated hereinbefore, the intensity profile through the center of the central row in FIG. 4 is greatly improved as shown in FIG. 6 where the sequence of five spots located at columns 6∝10 (approximate positions 8–14) of the random pattern of FIG. 4 are clearly detected. From FIGS. 5 and 6, it is readily seen that there is a marked improvement in an ability of a digital optical tape read system to resolve individual bit cells or spots using properly decentered cylindrical and objective lenses (14 and 16) in accordance with the present invention. Each of the intensity peaks in an image at the detector array 48 (shown only in FIG. 3) is clearly mapped to a particular bit cell.

It is to be appreciated and understood that the specific embodiments of the invention described hereinbefore are merely illustrative of the general principles of the invention. Various modifications may be made by those of ordinary skill in the art which are consistent with the principles set forth. For example, the length of the line of light 25 (shown only in FIG. 1) need not traverse a row of bit cells. Instead, it is to be understood that this line of light 25 moves orthogonal to a direction of motion of the optical tape 24 to read a line of stored optical data. Still further, the line of light 25 can be disposed at a skew angle to the direction of motion of the optical tape 24. Still further, the present invention of providing a 180° phase difference between bit locations on an optical tape can be accomplished using other illumination arrangements. For example, in the illumination arrangement 20 of FIG. 2, the cylindrical lens 14 can be replaced with other than a cylindrical lens that is decentered by a distance "d" from the objective lens to obtain the 180° phase difference between bit locations. However, by using a lens other than a cylindrical lens, for example, a circular area is illuminated at the optical tape 24 rather than a line of light 25. Alternatively, a 180° phase difference between bit locations on an optical tape can be accomplished using a light source 12 in the illumination arrangement of FIG. 1 using microlenses in a line, or diffractive elements that provide illumination on the optical tape 24 having the 180° phase difference.

What is claimed is:

1. An optical tape read system comprising:
   an optical tape on which bit cells are stored along a plurality of tracks of bit cells, where each track comprises a line of bit cells, and each bit cell is representative of a bit of data from one of a group consisting of a first spot power reflectance representative of a first binary value and a second spot power reflectance representative of a second binary value; and
   illumination means for illuminating a predetermined area of the optical tape covering a plurality of bit cells with incident light that provides between 90° and 270° phase difference between adjacent bit cell locations on the optical tape to be concurrently read.

2. The optical tape read system of claim 1 wherein the illumination means comprises:
   a light source for providing a collimated coherent light beam;
   an objective lens having a longitudinal axis for imaging the collimated beam of light onto the optical tape; and
   a cylindrical lens disposed between the light source and the objective lens having a longitudinal axis which is decentered from the longitudinal axis of the objective lens by a predetermined distance in a predetermined direction for providing a 180° phase difference between adjacent bit cell locations to be read.

3. The optical tape read system of claim 2 wherein the cylindrical lens converges the collimated coherent light beam in a first of two orthogonal directions, and the objective lens images the converging coherent light beam from the cylindrical lens in the predetermined area on the optical tape as a line of light on a line of bit cells on the optical tape.

4. The optical tape read system of claim 3 wherein the line of bit cells on the optical tape is formed from one of a group consisting of (a) a track and (b) corresponding bit cells of each of a plurality of adjacent tracks.

5. The optical tape read system of claim 3 wherein the collimated coherent light beam from the light source has an arbitrary profile, the length of the light beam at the optical tape is sufficient to illuminate all of the plurality of data tracks, and the width of the light beam is no greater than a distance between bit cells in a data track.

6. The optical tape read system of claim 2 further comprising:
   a detector array comprising a plurality of light detectors; and
   optical means disposed between the cylindrical lens and the objective lens for redirecting and imaging light reflected from the predetermined area of the optical tape illuminated by the illumination means onto the detector array.

7. The optical tape read system of claim 6 wherein the optical means comprises:
   a quarter-wave plate for changing the polarization direction of light passing therethrough in either direction;
   a polarizing beam splitter cube for directing a converging light beam from the cylindrical lens through the quarter-wave plate towards the objective lens, and for directing the reflected light passing through the quarter-wave plate from the objective lens towards the detector array; and
   an imaging lens disposed between the polarizing beam splitter cube and the detector array for imaging the reflected light from the polarizing beam splitter cube onto the detector array.

8. The optical tape read system of claim 1 further comprising:
   a detector array comprising a plurality of light detectors; and
   optical means for imaging light reflected from the predetermined area of the optical tape illuminated by the illumination means on the detector array.

9. The optical tape read system of claim 1 further comprising:
   a detector array comprising a plurality of light detectors; and
   optical means for imaging light passing through the predetermined area of the optical tape illuminated by the illumination means on the detector array.

10. The optical tape read system of claim 1 wherein the illumination means comprises:
    a light source for providing a collimated coherent light beam;
    an objective lens having a longitudinal axis for imaging the collimated beam of light onto the optical tape; and
    a focusing lens disposed between the light source and the objective lens having a longitudinal axis which is decentered from the longitudinal axis of the objective lens by a predetermined distance in a predetermined direction for providing a 180° phase difference between adjacent bit cell locations to be read.

11. The optical tape read system of claim 1 wherein the illumination means comprises:
    a light source for providing a collimated coherent light beam which provides recurrent 180° phase shifts within a cross-sectional area of the light beam; and
    an objective lens disposed for receiving and imaging the collimated beam of light from the light source onto the optical tape to cover the plurality of bit cells and provide a 180° phase difference between adjacent bit cell locations to be read.

12. A method of reading binary data stored on an optical tape in the form of bit cells comprising the steps of:
    (a) generating a collimated coherent light beam which is directed at the optical tape; and
    (b) imaging the coherent light beam onto a predetermined area of the optical tape covering a plurality of bit cells with incident light that provides a 180° phase difference between adjacent bit cell locations on the optical tape to be concurrently read.

13. The method of claim 12 wherein in performing step (b) performing the substeps of:
    (b1) transmitting the collimated coherent light beam through a cylindrical lens for converging the light beam in a first of two orthogonal directions; and
    (b2) transmitting the converging light beam produced in step (b1) through an objective lens having a longitudinal axis which is decentered from a longitudinal axis of the cylindrical lens for imaging the collimated beam of light onto the predetermined area of the optical tape with light that provides a 180° phase difference between adjacent bit cell locations to be read.

14. The method of claim 12 comprising the further step of: (c) imaging light reflected from the predetermined area of the optical tape illuminated by the light beam generated in step (a) onto a detector array.

15. The method of claim 12 comprising the further step of: (c) imaging light passing through the predetermined area of the optical tape illuminated by the light beam generated in step (a) onto a detector array.

16. The method of claim 12 wherein in performing step (a), generating the collimated coherent light beam including recurrent 180° phase shifts within a cross-sectional area of the light beam.

* * * * *